US006454052B2

United States Patent
Wu

(10) Patent No.: US 6,454,052 B2
(45) Date of Patent: Sep. 24, 2002

(54) LUBRICATION DEVICE ADAPTED TO BE USED IN A PUNCHING MACHINE

(76) Inventor: Victor Ken-Seng Wu, No. 46, Lane 102, Sec. 2, Kwung-Fu Rd., Sanchung City, Taipei Hsien (TW)

(*) Notice: Subject to any disclaimer, the term of this patent is extended or adjusted under 35 U.S.C. 154(b) by 33 days.

(21) Appl. No.: 09/732,592

(22) Filed: Dec. 8, 2000

(30) Foreign Application Priority Data

Jan. 27, 2000 (TW) .......................................... 089201485

(51) Int. Cl.[7] ................................................. F16H 7/30
(52) U.S. Cl. ................................................... 184/55.1
(58) Field of Search ............................ 184/55.1, 55.2, 184/57, 18, 24, 6.28; 92/157, 158

(56) References Cited

U.S. PATENT DOCUMENTS 3,767,012 A * 10/1973 Jimi et al. ................... 164/149
4,977,804 A * 12/1990 Naito ........................... 83/129

* cited by examiner

Primary Examiner—Jack Lavinder
Assistant Examiner—C. T. Bartz
(74) Attorney, Agent, or Firm—Ostrolenk, Faber, Gerb & Soffen, LLP

(57) ABSTRACT

A lubrication device is applied in a punching machine, and includes a hollow workpiece-guiding unit, and an oil feeding assembly, and a compressed-air supplying unit. The workpiece-guiding unit defines an interior chamber, and has a plate passage unit for extension of a horizontal metal plate therethrough. The plate passage unit is in fluid communication with the interior chamber in the workpiece-guiding unit. The oil feeding assembly supplies lubricating oil into the workpiece-guiding unit. The compressed-air supplying unit supplies compressed air to combine with the lubricating oil so that the lubricating oil is trained on the compressed air to form an oil gas, which flows into the interior chamber in the workpiece-guiding unit and onto the top and bottom surfaces of the metal plate.

5 Claims, 5 Drawing Sheets

LUBRICATION DEVICE ADAPTED TO BE USED IN A PUNCHING MACHINE

BACKGROUND OF THE INVENTION

1. Field of the Invention

The present invention relates to a lubrication device, more particularly to a lubrication device that is adapted to be employed in a punching machine.

2. Description of the Related Art

FIG. 1 illustrates a conventional lubrication device 1 which is employed in a punching machine and which includes a pair of felt rollers 12 that cooperatively define a plate passage unit therebetween to permit extension of a metal plate 130 therethrough, an oil container 10 disposed above the rollers 12, and a pipe unit 11 which has two ends 110, 111 that are connected fluidly to the container 10 and the upper roller 12 for supplying lubrication oil 100 onto the metal plate 130.

Some of the drawbacks of the aforementioned conventional lubrication device are as follows:

It is noted that in order to distribute and apply the lubrication oil over the entire surface of the metal plate 130, the latter is conveyed through the plate passage unit at a relatively slow rate, thereby prolonging the feeding time thereof.

The oil gas formed on the rollers 12 and the plate 130 usually spreads out of the plate passage unit during the conveying process of the metal plate 130, thereby soiling the immediate surrounding of the worksite.

SUMMARY OF THE INVENTION

The object of the present invention is to provide a lubrication device which can obviate the aforesaid drawbacks that generally result from the use of the conventional lubrication device.

Accordingly, a lubrication device of the present invention is adapted to be used in a punching machine, and includes a hollow workpiece-guiding unit, and an oil feeding assembly, and a compressed-air supplying unit. The workpiece-guiding unit defines an interior chamber therein and has a plate passage unit for extension of a horizontal metal plate therethrough. The plate passage unit is in fluid communication with the interior chamber in the workpiece-guiding unit. The oil feeding assembly supplies lubricating oil into the workpiece-guiding unit. The compressed-air supplying unit supplies compressed air to combine with the lubricating oil so that the lubricating oil is trained on the compressed air to form an oil gas, which flows into the interior chamber in the workpiece guiding unit and onto the top and bottom surfaces of the metal plate.

BRIEF DESCRIPTION OF THE DRAWINGS

Other features and advantages of the invention will become more apparent in the following detailed description of the preferred embodiments of this invention, with reference to the accompanying drawings, in which.

DETAILED DESCRIPTION OF THE PREFERRED EMBODIMENTS

Figure 1:
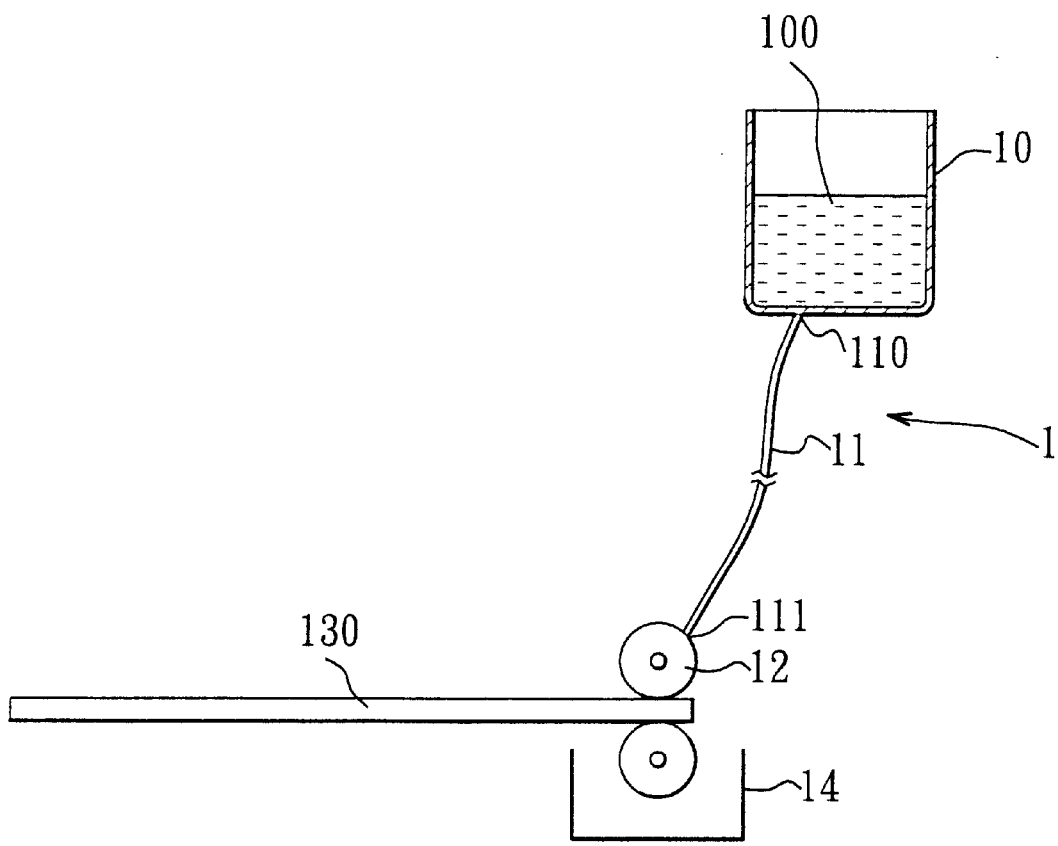
FIG. 1 is a schematic view of a conventional lubrication device, illustrating how a metal plate is fed therethrough.
Figure 2:
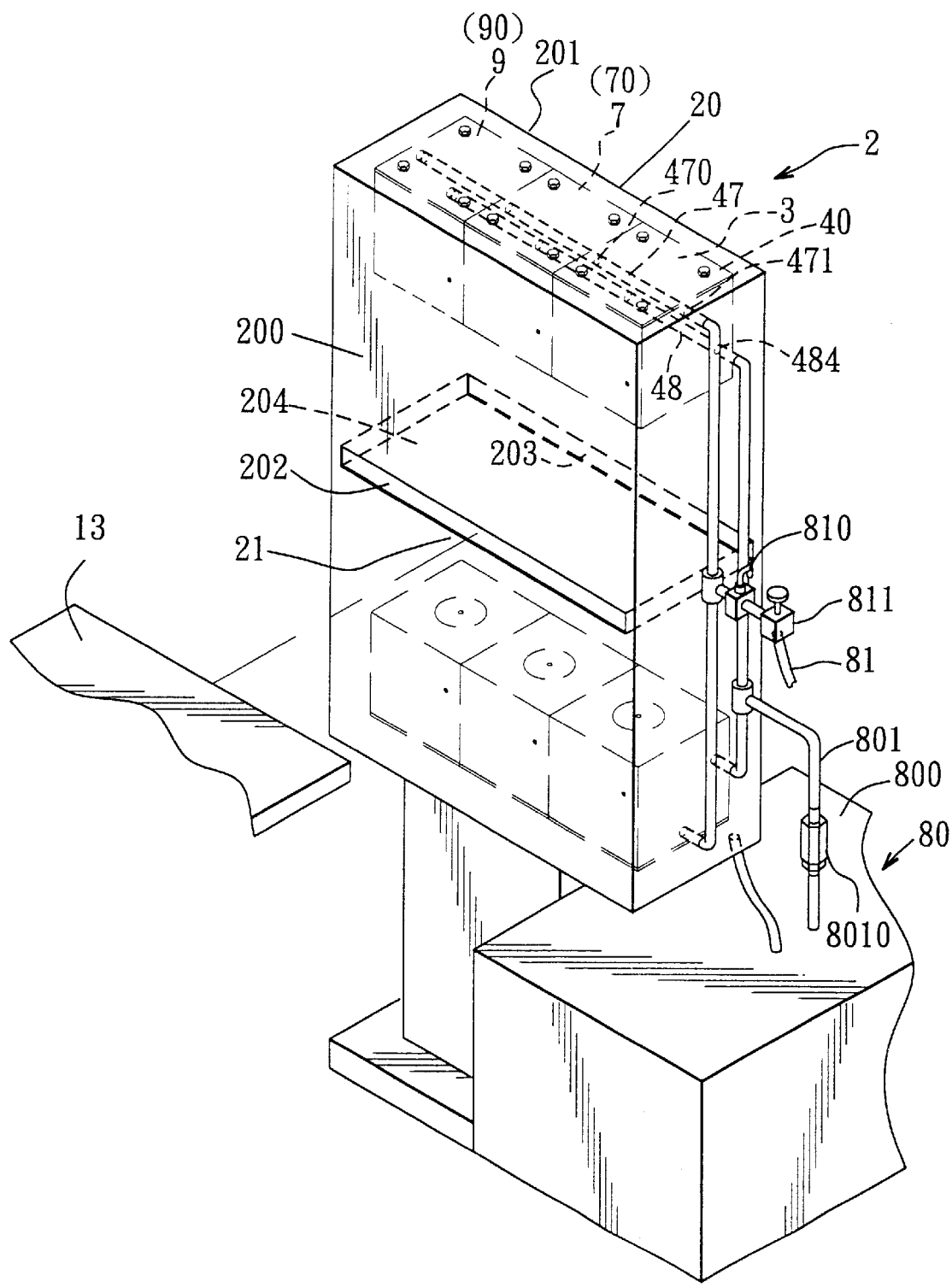
FIG. 2 is a perspective view of the preferred embodiment of a lubrication device of the present invention, illustrating how a metal plate is fed therethrough.
Figure 3:
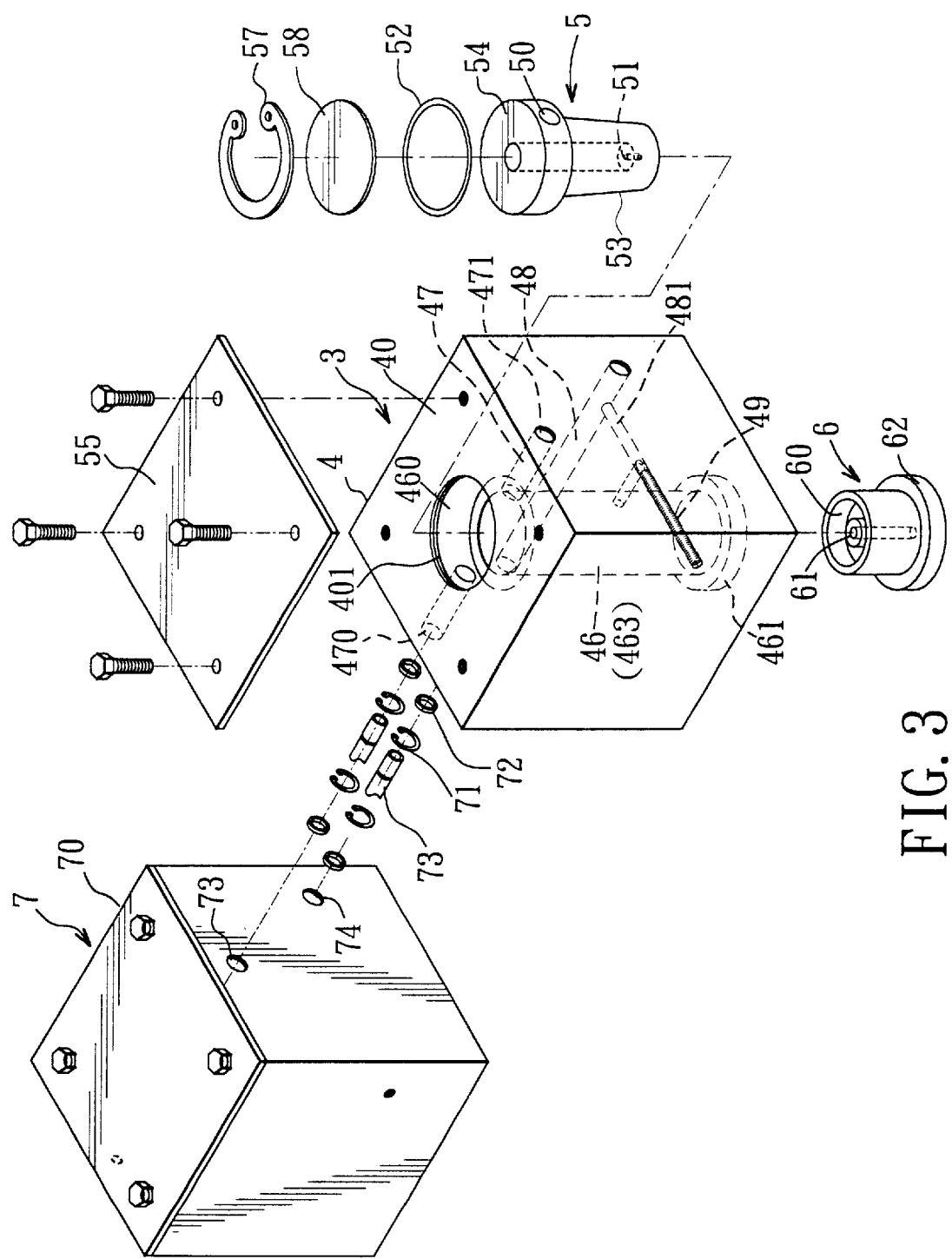
FIG. 3 illustrates two oil-gas spraying units employed in the preferred embodiment, wherein one of the spraying units is in an exploded state to show the interior thereof.
Figure 4:
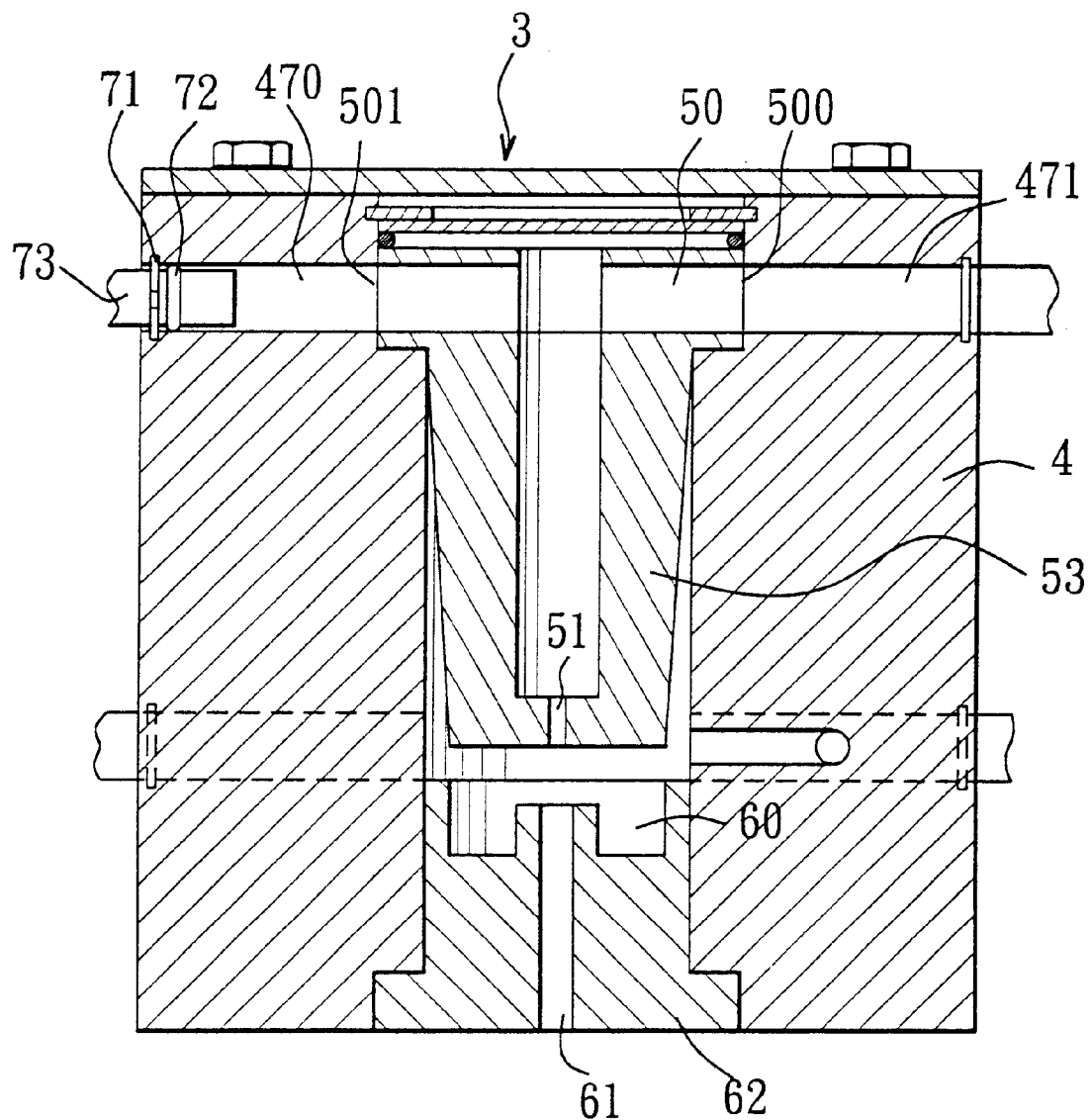
FIG. 4 is a sectional view of the oil-gas spraying unit shown in FIG. 3.

Referring to FIGS. 2, 3 and 4, the preferred embodiment of a lubrication device of the present invention is adapted to be employed in a punching machine (not shown), and is shown to include a hollow workpiece-guiding unit 2, an oil feeding assembly 80, and a compressed-air supplying unit 81.

0As illustrated, the workpiece-guiding unit 2 is adapted to be disposed on the punching machine, and defines a sealed interior chamber 21 herein. The workpiece-guiding unit 2 defines a plate passage unit 204 for extension of a horizontal metal plate 13 therethrough. The plate passage unit 204 is in fluid communication with the sealed interior chamber 21 in the workpiece-guiding unit 2.

The oil feeding assembly 80 includes an oil container 800 which supplies lubricating oil into the workpiece-guiding unit 2 by means of an oil conveying pipe unit 801. Preferably, a one-way valve 8010 is mounted on the pipe unit 801 to prevent return flow of oil into the container 800.

The compressed-air supplying unit 81 supplies compressed air to combine with the lubricating oil so that the lubricating oil is trained on the compressed air to form an oil gas, which flows into the interior chamber 21 in the workpiece-guiding unit 2 and onto the top and bottom surfaces of the metal plate 13. Preferably, the compressed-air supplying unit 81 includes a pressure valve 811 for flow control of compressed-air into the interior chamber 21. An electromagnetic valve control element 810 is provided to control the actuation of the valve 811.

The interior chamber 21 is defined by top, bottom, left, right, and front and rear walls 200,201 so that the oil gas is prevented from flowing out of the chamber 21 when the metal plate 13 extends through the plate passage unit 204 in the chamber 21. Preferably, the plate passage unit 204 includes a front guide hole 202 formed through the front wall 200, and a rear guide hole 203 formed through the rear wall 201. The metal plate 13 extends through the front and rear guide holes 202, 203.

In the preferred embodiment, the workpiece-guiding unit 2 is shaped as a hollow rectangular casing 20, and includes two aligned horizontal rows 3 of oil gas spraying units 4,7,9. The rows 3 are disposed respectively in the upper and lower end portions of the interior chamber 21 in the workpiece-guiding unit 2. Each of the spraying units 47,79 includes a tubular body 40,70,90, a nozzle unit 5, and a gas spraying member 6. The tubular body 40,70,90 has a vertical central bore 46 that is formed therethrough.

The oil feeding assembly 80 further includes an oil passage 48 that is formed in the tubular body 40,70,90 and that is in fluid communication with the central bore 46 and the oil pipe unit 801 for supplying the lubrication oil into the central bore 46. The compressed-air supplying unit 81 includes an air passage 47 that is formed in the tubular body 40,70,90 and that is in fluid communication with the central bore 46, in which the lubrication oil combines with the compressed air to form the oil gas. The central bore 46 has an air entrance end 460 and a gas exit end 461. The nozzle unit 5 is confined within the air entrance end 460 of the central bore 46 in the tubular body 40,70,90, and has an air inlet 50 that is in fluid communication with the air passage 47, and an air outlet 51 that is directed toward the gas exit end 461 of the central bore 46 for supplying the compressed air into the central bore 46 through the air outlet 51. The gas spraying member 6 is confined in the gas exit end 461 of the central bore 46, and has a gas outlet 61 that is adapted to be directed toward the metal plate 13, thereby permitting flow of the oil gas from the central bore 46 through the gas outlet 61.

Preferably, the central bore 46 has a uniform-diameter intermediate portion 463. Each of the air entrance end 460 and the gas exit end 461 has a diameter larger than that of the uniform-diameter intermediate portion 463. The tubular body 40,70,90 further has an annular groove 401 formed in the air entrance end 460 of the central bore 46. Each of the oil-gas spraying units 4, 7, 9 further includes a cover plate 55 connected fixedly to the tubular body 40,70,90 for confining the nozzle unit 5 within the air entrance end 460 of the central bore 46 in the tubular body 40,70,90.

The nozzle unit 5 includes a nozzle body having an inner portion 53 that is formed with the air outlet 51 and that has an outer end, and an outward flange 54 that projects radially and outwardly from the outer end of the inner portion 53 and that is formed with the air inlet 50. The inner portion 53 of the nozzle body is inserted into the uniform-diameter intermediate portion 463 of the central bore 46 such that the outward flange 54 is received fittingly within the air entrance end 460 of the central bore 46. A C-shaped retaining ring 57 is disposed in the central bore 46, and engages the annular groove 401 in the tubular body 40,70,90.

A fluid-impermeable circular plate 58 is disposed in the central bore 46, and has an outer periphery that abuts against the C-shaped retaining ring 57. An O-shaped ring 52 is clamped between the circular plate 58 and an end surface of the outward flange 54 of the nozzle body.

Preferably, the gas spraying member 6 has a hollow tubular inner portion 60 that is inserted into the uniform-diameter intermediate portion 463 of the central bore 46 and that has an outer end, and an outward flange 62 that projects radially and outwardly from the outer end of the inner portion 60 and that is press fitted and adhered within the gas exit end 461 of the central bore 46. The gas outlet 61 is formed through the outward flange 62.

Referring to FIGS. 3 and 4, the inner portion 53 of the nozzle body has two air ports 500, 501 at two diametrically opposed positions of the outward flange 54. The air passage 47 in each of the oil-gas spraying unit 4,7,9 includes a first passage section 471 that has two opposite ends respectively and fluidly connected to the air port 500 of the nozzle unit 5 and the compressed-air supplying unit 81, and a second passage section 470 that has two opposite ends respectively and fluidly connected to the air port 501 of the nozzle unit 5 and the central bore 46 of the oil-gas spraying unit 7,9 via a leak-proof connecting unit consisting of a pipe section 73, a seal ring 72 and a C-shaped retainer ring 71. The oil passage 48 of the oil-gas spraying unit 4 can be fluidly connected to the central bore of the adjacent oil-gas spraying unit 7,9 in the same manner. The oil passage 48 in the spraying unit 4,7,9 is preferably provided with a flow control element 49 that is bolted into a pipe section 481 of the oil passage 48, such that after removal of the workpiece-guiding unit 2 relative to the spray unit 4,7,9, the amount of oil flowing into the nozzle unit 5 can be adjusted by manipulation of the control element 49.

Figure 5:
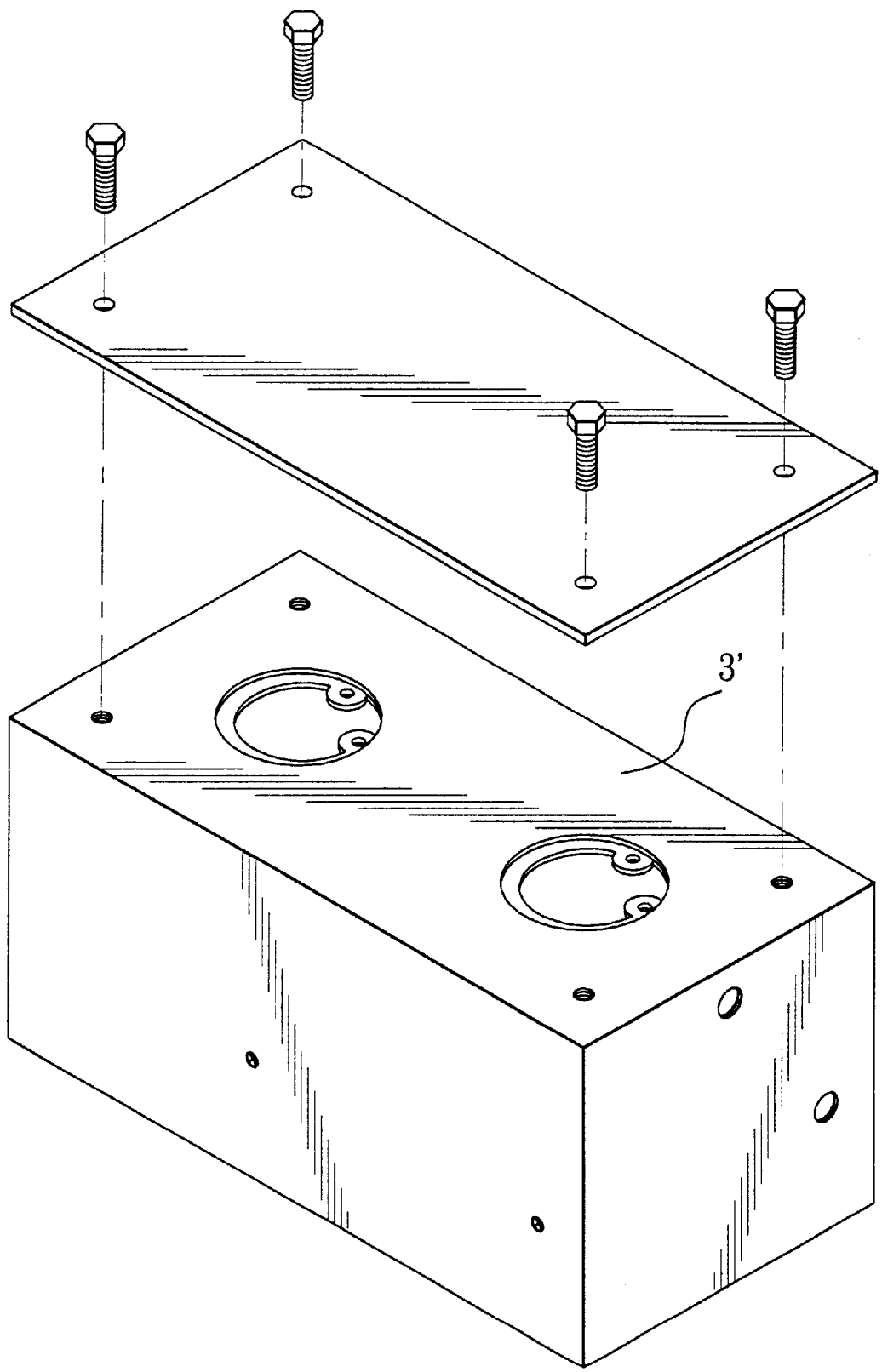
FIG. 5 illustrates a modified row of the oil-gas spraying units of the present invention.

Referring to FIG. 5, a modified preferred embodiment of this invention is shown to be similar to the previous embodiment in construction except that the tubular bodies of two oil-gas spraying units are integrally formed as a module 3' in order to eliminate the use of a leak-proof connecting unit between the spraying units.

With this invention thus explained, it is apparent that numerous modifications and variations can be made without departing from the scope and spirit of this invention. It is therefore intended that this invention be limited only as indicated in the appended claims.

I claim:

1. A lubrication device adapted to be used in a punching machine, comprising:
    a hollow workpiece-guiding unit defining an interior chamber therein and adapted to be disposed on the punching machine, the workpiece-guiding unit having a plate passage unit for extension of a horizontal metal plate therethrough, the plate passage unit being in fluid communication with the interior chamber in the workpiece-guiding unit;
    an oil feeding assembly for supplying lubricating oil into the workpiece-guiding unit; and
    a compressed-air supplying unit for supplying compressed air to combine with the lubricating oil so that the lubricating oil is trained on the compressed air to form an oil gas, which flows into the interior chamber in the workpiece guiding unit and onto top and bottom surfaces of the metal plate;
    the workpiece-guiding unit is shaped as a hollow rectangular casing, and includes two aligned horizontal rows of oil-gas spraying units, the rows being disposed respectively in upper and lower end portions of the interior chamber in the workpiece-guiding unit, each of the oil-gas spraying units including:
    a tubular body having a vertical central bore that is formed therethrough, the oil feeding assembly including an oil passage that is formed in the tubular body and that is in fluid communication with the central bore for supplying the lubrication oil into the central bore, the compressed-air supplying unit including an air passage that is formed in the tubular body and that is in fluid communication with the central bore, in which the lubrication oil combines with the compressed air to form the oil gas, the central bore having an air entrance end and a gas exit end;
    a nozzle unit confined within the air entrance end of the central bore in the tubular body, and having an air inlet that is in fluid communication with the air passage unit, and an air outlet that is directed toward the gas exit end of the central bore for supplying the compressed air into the central bore through the air outlet; and
    a gas spraying member confined in the gas exit end of the central bore, and having a gas outlet that is adapted to be directed toward the metal plate, thereby permitting flow of the oil gas from the central bore and through the gas outlet.

2. The lubrication device as defined in claim 1, wherein the interior chamber in the workpiece-guiding unit is sealed when the metal plate extends through the plate passage unit in the workpiece-guiding unit for preventing flow of the oil gas out of the workpiece-guiding unit.

3. The lubrication device as defined in claim 1, wherein the workpiece-guiding unit includes a front wall and a rear wall, the plate passage unit including a front guide hole formed through the front wall, and a rear guide hole formed through the rear wall, the metal plate extending through the front and rear guide holes.

4. The lubrication device as defined in claim 1, wherein the central bore has a uniform-diameter intermediate portion, the air entrance end and the gas exit end having a diameter larger than that of the uniform-diameter intermediate portion, the tubular body having an annular groove formed in the air entrance end, each of the oil-gas spraying units further including a cover plate connected fixedly to the tubular body for confining the nozzle unit within the air entrance end, the nozzle unit including:

a nozzle body having an inner portion that is formed with the air outlet and that has an outer end, and an outward flange that projects radially and outwardly from the outer end of the inner portion and that is formed with the air inlet, the inner portion being inserted into the uniform-diameter intermediate portion of the central bore, the outward flange being received fittingly within the air entrance end of the central bore;

a C-shaped retaining ring engaging the annular groove in the tubular body;

a fluid-impermeable circular plate having an outer periphery that abuts against the C-shaped retaining ring; and an O-shaped ring clamped between the circular plate and an end surface of the outward flange of the nozzle body.

5. The lubrication device as defined in claim 4, wherein the gas spraying member has a hollow tubular inner portion that is inserted into the uniform-diameter intermediate portion of the central bore and that has an outer end, and an outward flange that projects radially and outwardly from the outer end of the inner portion and that is press fitted and adhered within the gas exit end of the central bore, the gas outlet being formed in the outward flange.

\* \* \* \* \*